United States Patent
Harbers et al.

(10) Patent No.: US 7,234,820 B2
(45) Date of Patent: Jun. 26, 2007

(54) ILLUMINATORS USING REFLECTIVE OPTICS WITH RECYCLING AND COLOR MIXING

(75) Inventors: Gerard Harbers, Sunnyvale, CA (US); Laurie Scheffel, Tucson, AZ (US); Matthijs Keuper, San Jose, CA (US); Robert H. Holman, Evanston, IL (US)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 232 days.

(21) Appl. No.: 11/104,220

(22) Filed: Apr. 11, 2005

(65) Prior Publication Data

US 2006/0227302 A1    Oct. 12, 2006

(51) Int. Cl.
| G03B 21/26 | (2006.01) |
| G03B 21/28 | (2006.01) |
| G02B 6/10 | (2006.01) |
| G02B 5/30 | (2006.01) |
| G02B 27/28 | (2006.01) |
| G02B 21/14 | (2006.01) |
| F21V 9/00 | (2006.01) |

(52) U.S. Cl. ............................ 353/94; 353/97; 353/99; 385/146; 362/231; 362/26; 362/555; 359/490; 359/634

(58) Field of Classification Search ................ 353/94, 353/97–99; 385/901, 146; 362/231, 26, 362/555, 19, 293; 359/490, 634; 313/372, 313/475

See application file for complete search history.

(56) References Cited

U.S. PATENT DOCUMENTS

| 5,146,248 A * | 9/1992 | Duwaer et al. ............. 353/122 |
| 6,869,206 B2 | 3/2005 | Zimmerman et al. |
| 7,040,767 B2 * | 5/2006 | Lee et al. ...................... 353/99 |
| 7,048,385 B2 * | 5/2006 | Beeson et al. ................ 353/97 |
| 7,059,731 B2 * | 6/2006 | Lee et al. ...................... 353/99 |
| 7,070,300 B2 * | 7/2006 | Harbers et al. ............. 362/231 |
| 2006/0139580 A1 * | 6/2006 | Conner ......................... 353/98 |

* cited by examiner

*Primary Examiner*—W. B. Perkey
*Assistant Examiner*—Magda Cruz
(74) *Attorney, Agent, or Firm*—Patent Law Group LLP; Brian D. Ogonowsky (57) ABSTRACT

Various optical techniques are described for obtaining a specified light output from an LED source. One technique uses a parabolic reflector surrounding an LED or LED array to create a collimated beam, and the light exit opening of the parabolic reflector is defined by a reflective disc with an opening of the desired size. Any generated light that is outside of the opening is reflected back into the parabolic reflector and re-reflected until the light exits the opening. For mixing different light colors from different LEDs or energized phosphors, a mixing tunnel is used. The mixing tunnel includes angled dichroic mirrors or angled polarizer mirrors that selectively reflect and pass selected colors or polarizations of light to a single output port of the mixing tunnel. Efficient and compact ways to energize phosphors are also described. Other optical techniques are also described.

20 Claims, 6 Drawing Sheets

ILLUMINATORS USING REFLECTIVE OPTICS WITH RECYCLING AND COLOR MIXING

GOVERNMENT LICENSE RIGHTS

The U.S. Government has a paid-up license in this invention and the right in limited circumstances to require the patent owner to license others on reasonable terms as provided for by the terms of contract number USDC RFP03-95 awarded by Army Research Labs.

FIELD OF THE INVENTION

This invention relates to light emitting diodes (LEDs) or other solid state light sources and, in particular, to collection optics for these sources for obtaining a desired emission (e.g., a collimated and color mixed beam).

BACKGROUND

LED dies typically emit light over a very wide angle, typically up to 90 degrees off the center axis. It is common to redirect the light emitted by the LED using a lens or a reflective cup. Such simple optical techniques are adequate for devices used as indicator lights or where a precise emission pattern is not required.

When light from different color LEDs (e.g., RGB LEDs) needs to be mixed, such as for creating a white light, a typical technique is to mix the light in a diffusively reflective box having a light exit opening.

The above techniques have limited applications. An LED illumination system may consist of one or more LEDs (e.g., an array of LEDs) and both collecting and color combination optics. When the light output of an LED illumination system is narrowly specified for a system, innovative optical solutions must be used. The embodiments described herein are generally useful for étendue limited systems such as for projection displays (e.g., rear projection TV's or front projectors), automotive applications (e.g., headlights), fiber optics, accent lighting, color mixing in a compact space, and other applications.

SUMMARY

Various optical techniques are described for obtaining a specified light output from an LED illumination system.

In some applications, a collimated beam of specified cross-section (to obtain a desired étendue) is created. To achieve the desired beam, a reflector (e.g., of parabolic shape) surrounds the LED or LED array to create a collimated beam, and the light exit opening of the reflector is defined by a reflective disc (or other shape) with an opening of the desired size and shape (e.g., circular, rectangular, etc.). Any generated light that is outside of the opening is reflected back into the reflector by the reflective disc and re-reflected until the light exits the opening. The opening size and/or reflective collimator may be easily changed without changing the LED source for different applications.

Preferably, the exit opening in the reflective disc is approximately the same as the entrance opening in an application system that receives and employs the transmitted light. The reflector and reflective disc are configured to cause the etendues of the two light systems to match. Etendue is basically the opening size multiplied by the solid angle the system accepts light from (or, for a transmitter, the solid angle transmitted). The etendue may be calculated by $A*\sin(a)^2$, where A is the area (opening size) and $a$ is the solid angle. A light transmitting system with an exit opening larger than the entrance opening of the accepting system will lose light at the interface unless the unused light is reflected back into the transmitting system as in the system described herein.

Instead of a 100% reflective disc defining the opening, the light opening may be a reflective polarizer which transmits only light having the desired polarization and reflects back light with an undesired polarization state. The collection optics may contain an element or material which receives the reflected light and changes its polarization to be a desired polarization. In this way, the light is conserved and eventually is transmitted through the opening.

Alternatively, the light opening may be a diffractive optics structure that transmits light within a particular cone of light and reflects back light outside of the cone. Any light reflected back is re-reflected towards the opening.

Alternatively, the light opening may be a dichroic mirror that transmits light within a certain wavelength range and angle and reflects back all other light. Any light reflected back is re-reflected towards the opening.

Combinations of the various optics may be used to transmit light having only certain qualities to a downstream system.

The light source may be a remotely pumped phosphor, where the light from the phosphor is collected by a reflector, and the reflector has one or more of the optics described above. The light source may also be a Vertical Cavity Surface Emitting Laser (VCSEL) or any other type of light source.

For mixing different light colors from one or more light sources and recycling reflectors, a mixing tunnel is used having reflective walls. The mixing tunnel includes angled dichroic mirrors that reflect only specified colors and allow other colors to pass. By injecting red, green, and blue light into different sections of the mixing tunnel, the different colors are reflected by or pass through the angled mirrors to cause all light beams to be directed down the mixing tunnel. This causes the different colors of light to be combined to produce, for example, white light. The arrangement of the mirrors and the light sources can be selected to attenuate certain colors more than others to obtain the desired color mix. The mixing tunnel may be made very compact. Polarizer mirrors (or other selective reflectors) can be use instead of or in conjunction with the dichroic mirrors.

Other optical techniques are also described.

BRIEF DESCRIPTION OF THE DRAWINGS

Elements identified by the same numeral in the various figures are the same or similar.

DETAILED DESCRIPTION

Figure 1:
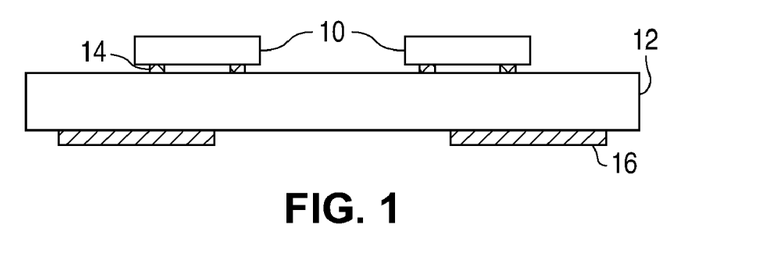
FIG. 1 is a side view of two LED dice, forming a portion of an array, mounted on a support structure, such as a submount.

FIG. 1 is a side view of LED dice 10 mounted on a submount 12. The dice 10 may be part of an array of LEDs arranged in, for example, a square or a circle. The submount 12 is used to interconnect LEDs, provide additional circuitry (e.g., an ESD device), and ease handling. The submount may be insulated aluminum, ceramic, silicon, or any other suitable material. A submount is not necessary for the invention. The dice 10 may instead be VCSELs or other light sources, including energized phosphors.

The LEDs may be any type. Flip-chips are shown in FIG. 1 with the n and p contacts 14 formed on one side of the die so that wire connectors are not needed. The submount 12 has corresponding contact pads, which may be soldered to the dice contact pads. In the example of FIG. 1, the submount has vias extending through the submount electrically connected to contact pads 16 for connection to a circuit board, a lead frame, or other support structure. Alternatively, the submount may include a plug-in connector on its top surface. Examples of forming LEDs, as well as different color phosphors, are described in U.S. Pat. Nos. 6,133,589; 6,274,399; 6,274,924; 6,291,839; 6,525,335; 6,576,488; and 6,649,440, all assigned to Lumileds Lighting and incorporated by reference. Any suitable LEDs and phosphors may be used in conjunction with the optics described herein.

Figure 2A:
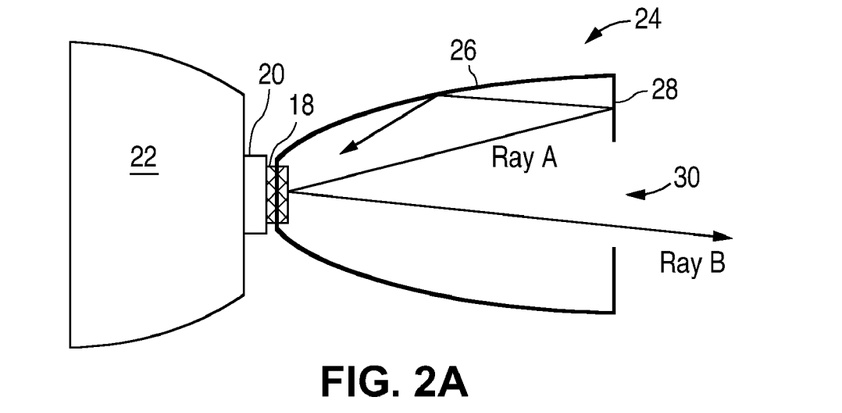
FIG. 2A is a side view of the LED array of FIG. 1 surrounded by a parabolic reflector with a reflective aperture for achieving a collimated beam having a specified cross-section.

FIG. 2A is a side view of an LED array 18, which may be the structure shown in FIG. 1 or any other LED array. A single LED may also be used if sufficiently bright. A heat sink 20 is shown connected to a fan 22 (only the fan shroud is shown) for a high power application such as a light projector. The heat sink 20 may include fins.

A reflector 24 comprises two parts. The side portions 26 form a generally parabolic reflector for collimating the light emitted by the LED array 18. The reflector will typically have a circular or rectangular cross-section. The parabolic reflector is made of or coated with a reflective material. For example, the reflector 24 may be formed of or covered with aluminum, silver, 3M ESR reflective film, or any other reflective material. Alternatively, the reflector may be made of a solid transparent material (e.g., plastic or glass) and rely on total internal reflection for collimating the light The reflector 24 may have any size, depending on the size of the LED array 18. Shapes other than parabolic are also envisioned for a particular beam shape. The reflector 24 may also be a solid (e.g., plastic or glass) where total internal reflection (TIR) off the walls is due to the difference in the refraction indices of the material and air.

The second part of the reflector 24 is a reflective aperture 28, which may be a reflective disc having an opening 30. The disc may be integral with the reflector 24 (using the same reflective material) or may be a separate piece. The opening 30 may be circular, square, or any other shape depending on the desired beam shape. Any light that is not directed through the opening 30 is reflected back into the reflector 24. The reflected light is then eventually re-reflected toward the opening 30 to create a concentrated collimated light beam of any size and shape. The substrate on which the LED array 18 is mounted is preferably reflective to increase the recycling efficiency.

The opening 30 may be sized for an optical fiber or any size light guide. Or, the light may project onto a remote screen, or used for any other application. Various other applications are described below.

The reflective aperture 28 and/or entire reflector 24 may be easily changed without changing the LED source for different applications.

Figure 2B:
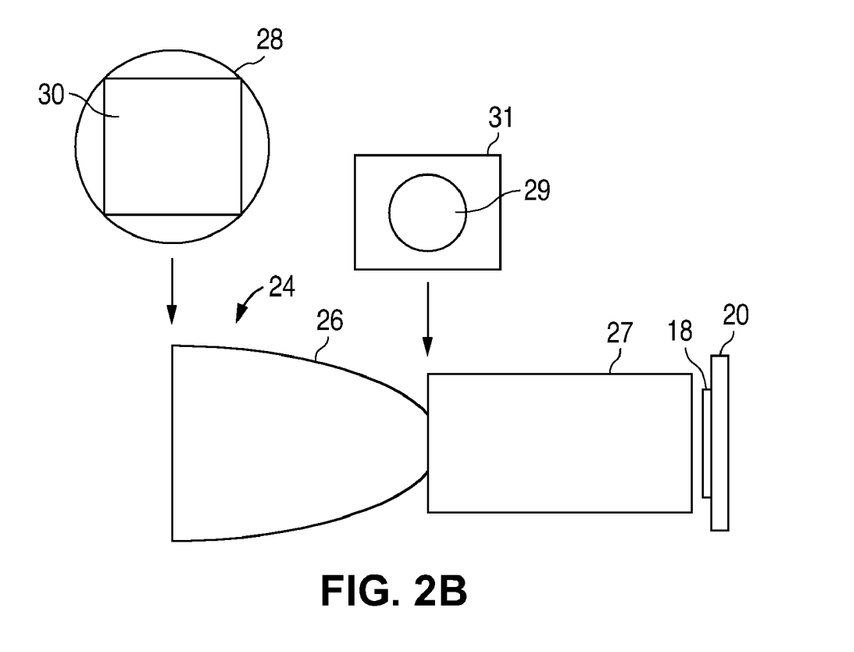
FIG. 2B illustrates additional detail of the reflector of FIG. 2A in conjunction with optics that only transmits light of desired characteristics into the reflector.

FIG. 2B illustrates the reflector of FIG. 2A receiving light from a light pipe 27 of any length. The light pipe may be a solid transparent material such as a fiber or rigid material. The LED array 18 supplies light to the light pipe 27. The light pipe 27 has an aperture defined by an opening 29 in a reflective plate 31. Light that is outside of the opening 29 is reflected back into the light pipe 27. The opening 29 is sized to match the opening of reflector 24. The LED array 18 may be mounted on a reflective substrate to reflect light toward the opening 29. The opening 29 may be a void or a selectively transmissive component. The opening may be a polarizer mirror for only transmitting light of a certain polarization and reflecting back other light, or a dichroic mirror for only transmitting light of a certain wavelength and reflecting back other light, or a diffraction grating for only transmitting light within a certain cone.

The reflective disc 28 is also shown in FIG. 2B having a reflective portion surrounding a rectangular opening 30. The opening 30 may be a void or be any of the selectively transmissive components described above. Thus, only light with certain desirable characteristics is transmitted into the downstream system.

The reflective aperture need not be centered around the optical axis. In fact, off-centering could increase the recycling efficiency in some cases.

The light reflected back into the system by the selectively transmissive mirror may be changed by an optical element or material within the reflector or light pipe 27 to have the desired properties. For example, the angle or polarization of the light may be changed so as to be transmitted by the grating or mirror.

Figure 3:
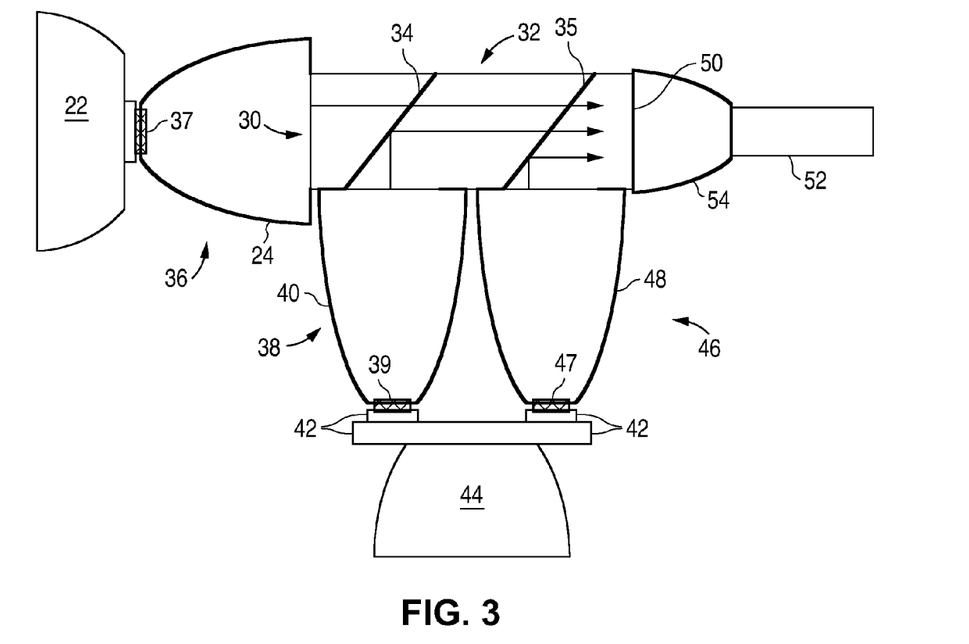
FIG. 3 is a side view of red, green, and blue LED collimated sources applying light to a color mixing tunnel (e.g., a solid transparent material) having angled dichroic mirrors.

FIG. 3 illustrates the light source of FIG. 2A providing an input into a light mixing tunnel 32. For all embodiments, the light source of FIG. 2B or another light source may be used. In one embodiment, mixing tunnel 32 is a solid transparent material, such as plastic or glass, where light is totally internally reflected at the outer surface due to the different indices of refraction of the material and air. Mixing tunnel 32 may be any shape, such as cylindrical, rectangular, etc. Dichroic mirrors 34 and 35 are fixed at angles (e.g., 45 degrees) internal to mixing tunnel 32. A dichroic mirror is a coated interference mirror that reflects only a particular tuned color (e.g., red, green, or blue) and transmits all other colors. Dichroic mirrors are commercial available for at least red, green, and blue light from, for example, Unaxis Balzers Limited.

A red light source 36 includes an array of red LEDs 37 and the remainder of the components shown in FIG. 2A for generating a collimated red beam of a size determined by opening 30. A blue light source 38 includes an array of blue LEDs 39, a reflector 40, which may be the same reflector 24 of FIG. 2A, a heat sink 42, and a fan 44. A green light source 46 includes an array of green LEDs 47 and a reflector 48, which may be the same reflector 24 of FIG. 2A. The green light source 46 may share the same heat sink 42 and fan 44 as the blue light source 38 for a more compact structure.

The interference coatings on the dichroic mirrors 34 and 35 allow red light to pass through with little attenuation. Dichroic mirror 34 reflects blue light, so light emitted by the blue light source 38 is reflected towards the mixing tunnel's output port 50. Dichroic mirror 35 reflects green light, so light emitted by the green light source 46 is reflected towards the mixing tunnel's output port 50. The shapes of the red, green, and blue beams result in the beams overlapping and mixing so that the light at the output port 50 is a homogenous color determined by the intensities of the red, green, and blue light sources. By adjusting the intensities of the three colors by, for example, current control or the number of LEDs in each array, any color, including white, can be produced.

Polarizer mirrors may be used instead of or in conjunction with the dichroic mirrors. Polarizer mirrors reflect only light having a certain polarization and pass light having other polarizations. The light from the different light sources in FIG. 3 may be filtered to have different polarizations, and the angled polarizer mirrors would perform the same function as the dichroic mirrors in FIG. 3.

In the example of FIG. 3, the light output of the mixing tunnel is guided by a light guide 52 (e.g., a Lucite rod) to another component such as the back of a liquid crystal panel in a projector. An angle conversion adapter 54 has an input port opening matched to the output port 50 of the mixing tunnel 32 and an output port opening matched to the light guide 52. The adapter 54 has reflective internal walls. Alternatively, the light output of the mixing tunnel 32 may be directly projected onto a target.

Figure 4:
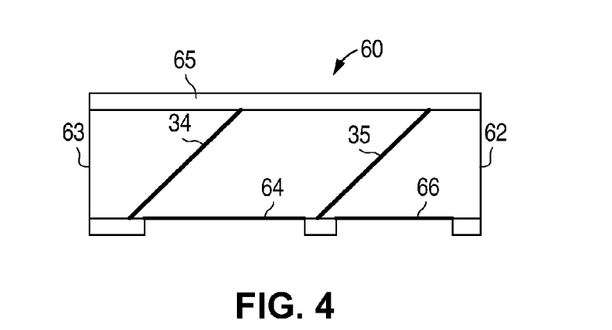
FIG. 4 is a side view of another embodiment of the mixing tunnel, where the tunnel is not solid and where the walls are reflective.

FIG. 4 is another embodiment of a mixing tunnel 60 having an opening 62 at the front for emitting light and an opening 63 at the back for receiving light, such as the red light source 36 in FIG. 3. Mixing tunnel 60 is hollow with reflective internal surface such as walls coated with an ESR film by 3M (98% reflective). A reflective coating 65 is shown on the walls. Mixing tunnel 60 may be formed of a clear plastic with the reflective coating on the inside or outside of the plastic tunnel. Alternatively, the mixing tunnel 60 walls may be polished aluminum. The reflective walls may be diffusively reflective (e.g., using flat white paint) to increase the light mixing. Mixing tunnel 60 may be any shape, such as cylindrical, rectangular, etc. Dichroic mirror 34 (blue reflecting) and dichroic mirror 35 (green reflecting) may be identical to those in FIG. 3. Dichroic mirrors 64 and 66 are located at the bottom input ports for increasing the efficiency of the system. Dichroic mirror 64 is selected to pass the incoming blue light but reflect all other colors to prevent these other colors from escaping the mixing tunnel through that input port. Dichroic mirror 66 is selected to pass the incoming green light but reflect all other colors to prevent these other colors from escaping the mixing tunnel through that input port.

Figure 5:
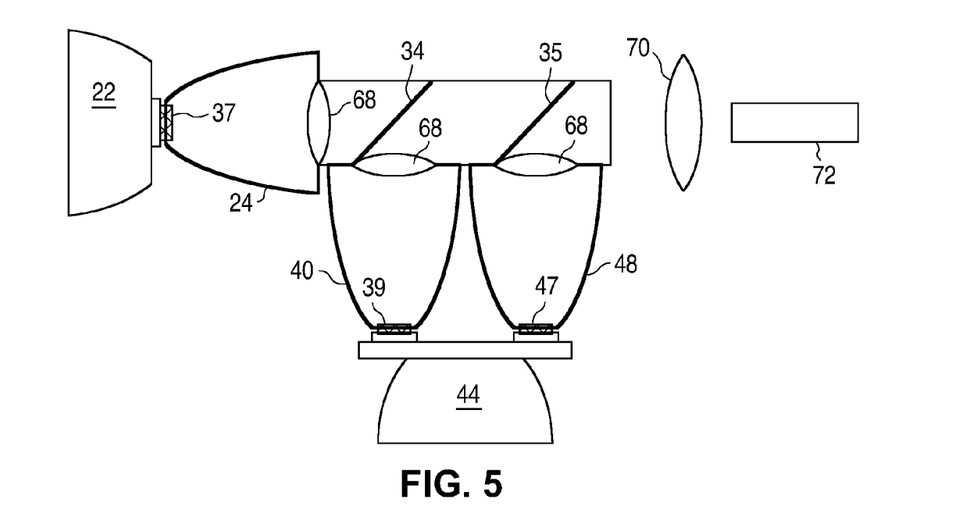
FIG. 5 is a side view of red, green, and blue LED collimated sources applying light to a color mixing tunnel using lenses at the input and output ports.

FIG. 5 is similar to FIG. 3 except that lenses 68 are used to affect the incoming light beam shape. For example, the reflectors 24, 40, 48 may be too small to adequately collimate the light. Lenses 68 will thus act to collimate the light or change the shape of the beam in any desired manner. A lens 70 may be used to create a focused, collimated, or other shaped beam for application to a light guide 72 or for direct projection.

Figure 6:
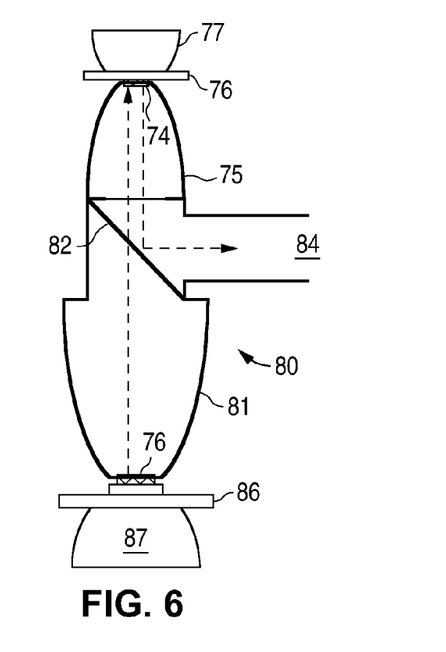
FIG. 6 is side view of a collimated blue or UV LED pump energizing a green phosphor, whose emitted green light is reflected out into a light tunnel by an angled dichroic mirror.

FIG. 6 illustrates an efficient technique for energizing a phosphor with a pump LED. In the example, a green phosphor 74 (i.e., a phosphor that emits green light when energized by the pump color) is being energized by a blue or UV LED array 76. Green phosphors are well known in the field of LEDs and may be purchased from Phosphor Technology Limited, Nazeing, Essex, England and elsewhere. The phosphor particles are distributed in a binder, which is then molded to have any shape, such as a sheet of any size. The formed green phosphor 74 is shown within a reflector 75, which may be the same or similar to the reflector 48 in FIG. 3. A heat sink 76 and fan 77 are also shown.

The blue or UV pump light source 80 and reflector 81, which may be the same or similar to light source 38 shown in FIG. 3, emits a collimated beam toward dichroic mirror 82, which is selected to pass the blue or UV light and reflect green light. The transmitted light energizes the green phosphor 74, whose emitted light is reflected by the dichroic mirror 82 toward the exit opening or light tunnel 84. The blue or UV light pump may be an array of LEDs or other type of light source. A heat sink 86 and fan 87 are also shown.

Figure 7:
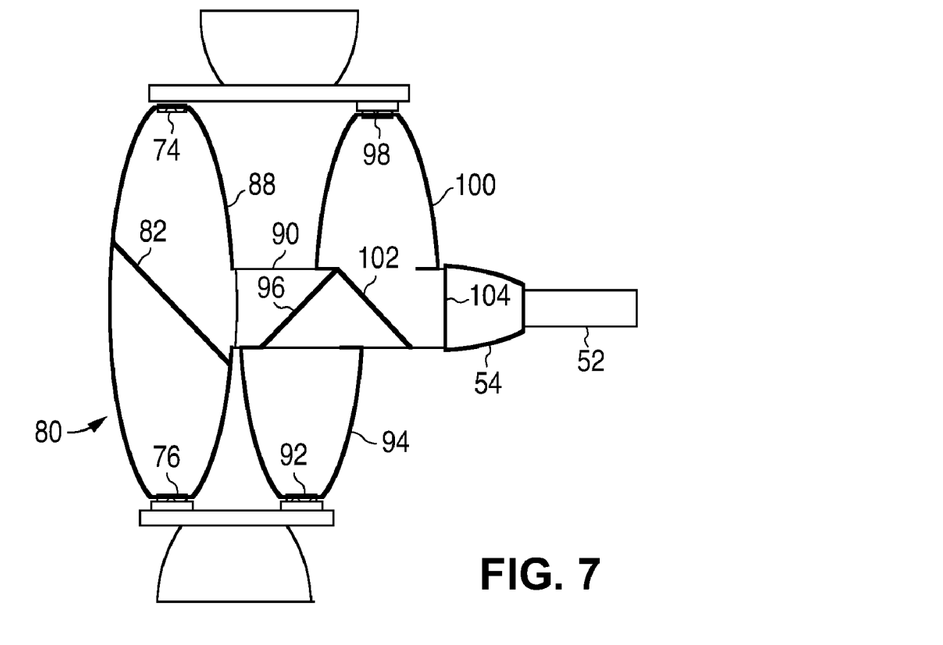
FIG. 7 is a side view of a mixer combining the techniques of FIGS. 3 and 6.

FIG. 7 illustrates a phosphor-energizing structure like that shown in FIG. 6 being used in conjunction with a mixing tunnel for mixing the green light with blue and red light. The blue or UV source 80 energizes the green phosphor 74 through the dichroic mirror 82. The reflector 88 collimates the light. The dichroic mirror 82 reflects the green light into the mixing tunnel 90. Blue light emitted by an array of blue LEDs 92 is collimated by reflector 94 and reflected by dichroic mirror 96, which passes all other colors. Red light emitted by an array of red LEDs 98 is collimated by reflector 100 and reflected by dichroic mirror 102, which passes all other colors. Accordingly, the green light, blue light, and red light are all mixed in the mixing tunnel 90 and directed to the output port 104 of the mixing tunnel 90. The light guide 52 and adapter 54 may be the same as in FIG. 3. The device may be a projector or any other device where mixed (e.g., white) light is desired.

Figure 8:
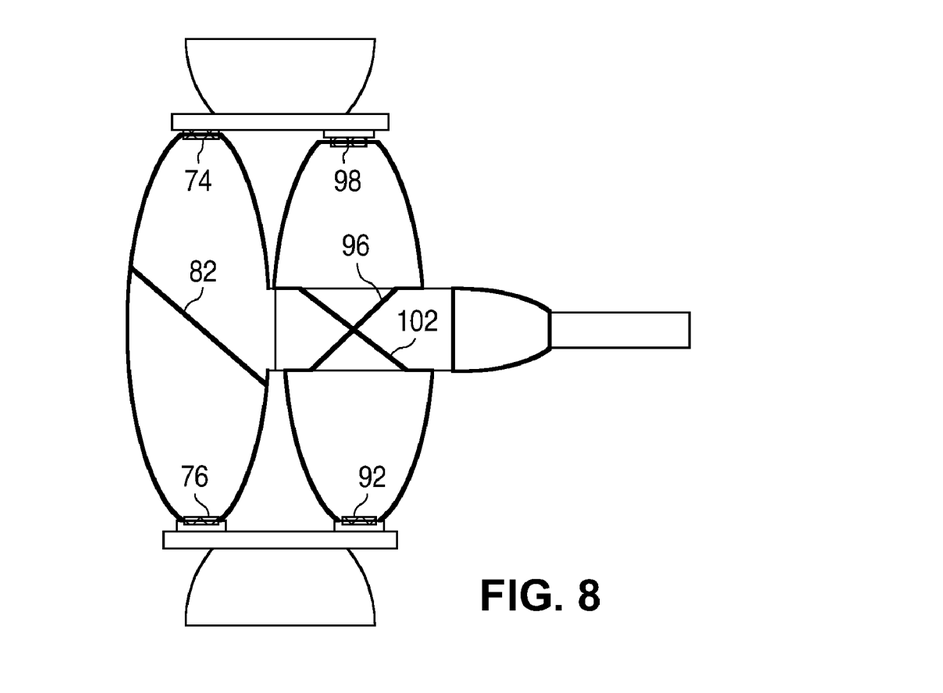
FIG. 8 is similar to the mixer of FIG. 7 but uses an X-mirror geometry.

FIG. 8 illustrates a structure similar to FIG. 7 except that an X configuration of dichroic mirrors 96 and 102 is used to form a more compact device.

Figure 9:
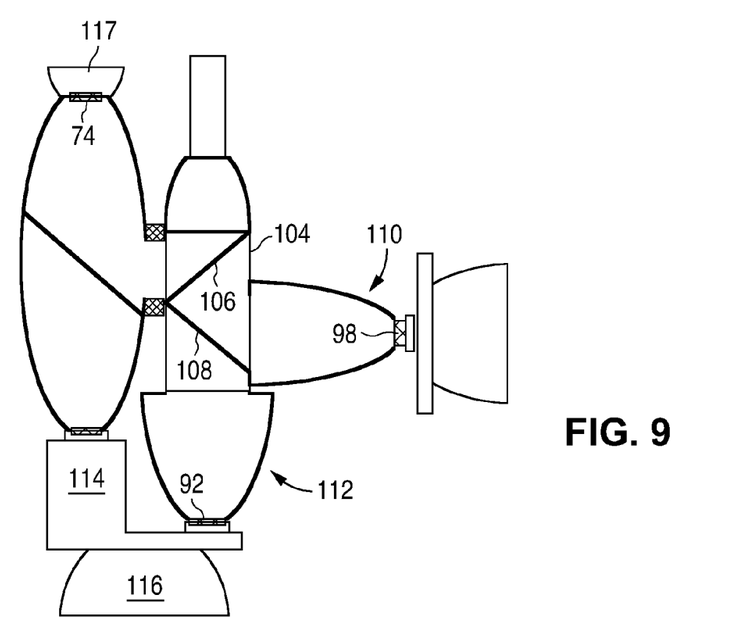
FIG. 9 is similar to the mixer of FIG. 7 but with the mixer rotated 90 degrees.

FIG. 9 illustrates a structure similar to FIG. 7 except that the mixing tunnel 104 is rotated 90 degrees, and the mirrors have been interchanged. Dichroic mirror 106 reflects the green light emitted by green phosphor 74, and dichroic mirror 108 reflects the red light emitted by the red light source 110. The blue light from the blue light source 112 passes through the mirrors 106 and 108. Heat sink 114 and fans 116 and 117 are also shown. Such a configuration attenuates the green light the least since it does not have to pass through any dichroic mirrors. The arrangement of light sources is thus used to optimize efficiencies for the three colors.

Figure 10:
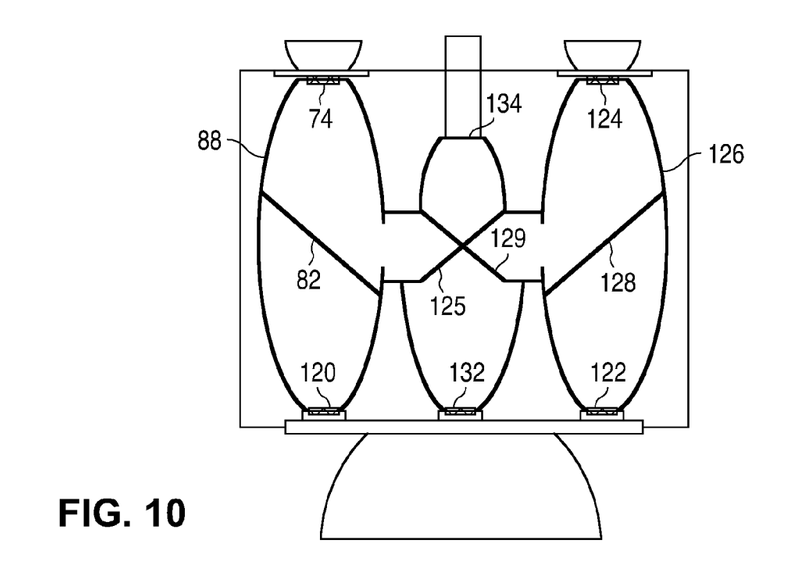
FIG. 10 is similar to FIG. 8 but using energized red and green phosphors as the red and green light sources.

FIG. 10 illustrates using a blue or UV pump 120 and 122 to energize a green phosphor 74 and a red phosphor 124 in collimating reflectors 88 and 126, respectively. Alternatively, a single blue or UV source may energize both phosphors using suitable mirror arrangements. Dichroic mirrors 82 and 125 reflect green light, and dichroic mirrors 128 and 129 reflect red light. Blue light from a blue LED array 132 passes to the output port 134.

The optical structures shown may be used with any suitable light source, not just LEDs. The structures have many possible applications such as in the display field.

Figure 11:
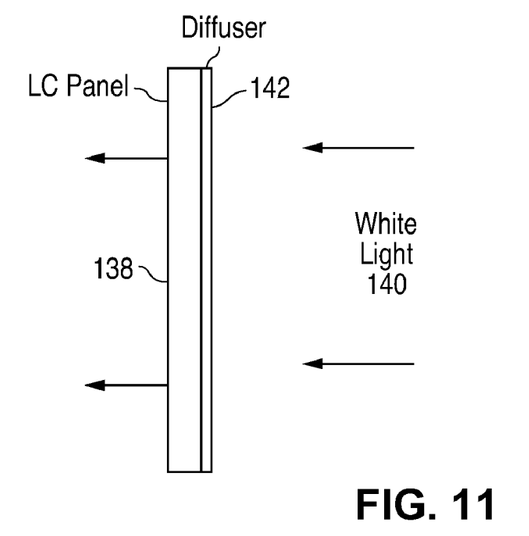
FIG. 11 is a side view of a liquid crystal panel having a backlight using RGB light sources mixed in a mixing tunnel.

FIG. 11 is a side view of a liquid crystal (LC) panel 138 in a color projector that receives display signals from a laptop computer and generates a color image for projection onto a screen. The panel 138 has red, green, and blue pixel LC shutters (controlled by the display signals) and red, green, and blue light filters for the associated pixels. The white light 140 from the mixing tunnels described above is applied to the back surface of the panel 138. The red filtered light is applied to the red pixel shutters, the green filtered light is applied to the green pixel shutters, and the blue filtered light is applied to the blue pixel shutters. The LC shutters selectively attenuate the R, G, or B light component at the corresponding RGB pixel areas to create a full color image projection. A diffuser 142 may additionally smooth the light across the shutter/filters. The white light sources described above generally replace the white arc lamp in a conventional projector. The light mixing techniques described can also create a backlight for LCD televisions and monitors.

Figure 12:
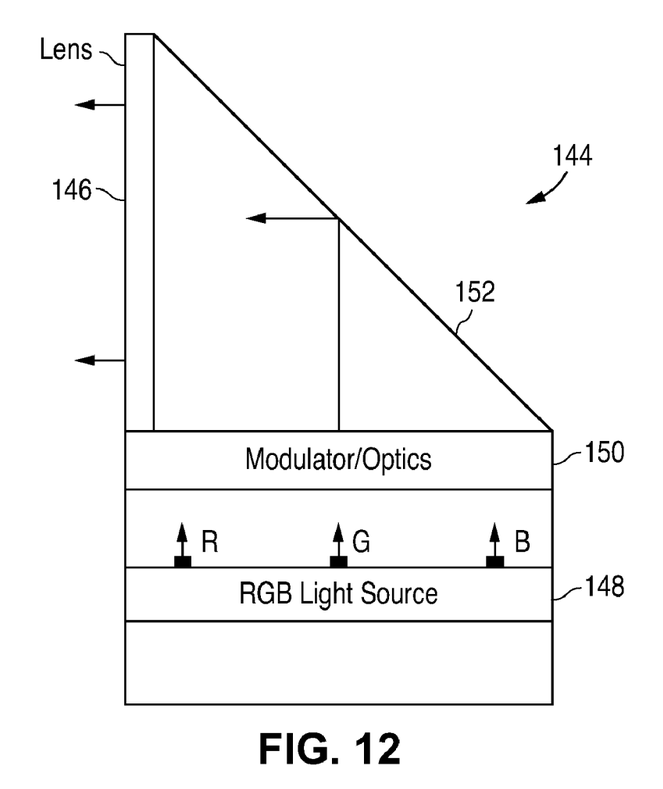
FIG. 12 is a side view of a rear projection TV using LEDs as a RGB light source.

FIG. 12 is a side view of a rear projection television 144 with a front lens 146 for brightening the image within a specified viewing angle, a set of red, green, and blue LED light sources 148, modulator/optics 150 for modulating and focusing the RGB light to produce a color TV image, and a reflector 152. Phosphors may instead be used as a light source as describe above. The modulator/optics 150 may include an array of controllable mirrors, an LC panel, or any other suitable device. Each light source may include the collimating reflector 24 in FIG. 2 along with the reflective aperture 28. The RGB light may be combined to form a white light source prior to the modulator optics 150, or separate modulated RGB images may be focused at the corresponding RGB pixel locations on the front lens 146. The latter technique avoids the use of attenuating RGB filters in the modulator/optics 150. This technique may also be used for projectors.

Other applications for the light systems described herein include automotive applications, fiber optics, accent lighting, stage lights, and other applications.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A light system comprising:
    a light source comprising:
        at least one light emitting element;
        a collection optic comprising a reflector with reflective walls for receiving light from the at least one light emitting element, the walls being at an angle with respect to the at least one light emitting element to generally collimate light emitted by the at least one light emitting element, the collection optic having an end with a first cross-sectional area;
        a partially reflective element at the end of the collection optic, the partially reflective element for transmitting light that meets certain criteria to an application system and for reflecting light that does not meet the certain criteria back towards the at least one light emitting element for re-reflection by the collection optic back towards the partially reflective element; and
    an application system optically coupled to the light source for employing the light transmitted by the partially reflective element, the partially reflective element reflecting light that would not be effectively employed in the application system had the light not been reflected.

2. The system of claim 1 wherein the reflector is a solid formed of a transparent material, wherein the walls reflect by total internal reflection (TIR) due to a difference in refraction indices of the transparent material and air.

3. The system of claim 1 wherein the reflector has a generally parabolic shape.

4. The system of claim 1 wherein the partially reflective element for transmitting light that meets certain criteria comprises a reflective material with an opening, wherein all light from the reflector that impinges on the reflective material is reflected back into the reflector, and light that passes through the opening is transmitted to the application system.

5. The system of claim 1 wherein the first cross-sectional area is rectangular.

6. The system of claim 1 wherein the first cross-sectional area is circular.

7. The system of claim 1 wherein the at least one light emitting element comprises at least one light emitting diode (LED).

8. The system of claim 1 wherein the partially reflective element for transmitting light that meets certain criteria comprises a reflective material with an opening, wherein all light from the reflector that impinges on the reflective material is reflected back into the reflector, and light that passes through the opening is transmitted to the application system, and wherein the opening comprises a polarizing mirror that transmits only light having a certain polarization and reflects light having other than the certain polarization.

9. The system of claim 1 wherein the partially reflective element for transmitting light that meets certain criteria comprises a reflective material with an opening, wherein all light from the reflector that impinges on the reflective material is reflected back into the reflector, and light that passes through the opening is transmitted to the application system, and wherein the opening comprises a dichroic mirror that transmits only light having first wavelengths and reflects light having other than first wavelengths.

10. The system of claim 1 wherein the partially reflective element for transmitting light that meets certain criteria comprises a reflective material with an opening, wherein all light from the reflector that impinges on the reflective material is reflected back into the reflector, and light that passes through the opening is transmitted to the application system, and wherein the opening comprises a diffraction grating that transmits only light impinging within a certain angle and reflects light impinging outside the certain angle.

11. The system of claim 1 wherein the partially reflective element has an opening smaller than the first cross-sectional area through which light is transmitted, and wherein the application system has a light entrance opening approximately the same size as the opening in the partially reflective element.

12. The system of claim 1 wherein the application system comprises a light mixing tunnel having a light entrance opening smaller in cross-section than the first cross-sectional area.

13. The system of claim 12 wherein the light source comprises a first light source, wherein the partially reflective element has an opening smaller than the first cross-sectional area through which light is transmitted, and wherein the light mixing tunnel comprises:
- a first opening optically coupled to the opening in the partially reflective element for receiving light from the at least one light emitting element, the at least one light emitting element emitting light of a first color;
- a second opening for receiving light from a second light source emitting light of a second color;
- wherein the light mixing tunnel has internally reflective walls;
- the first light source supplying the first color light into the light mixing tunnel;
- the second light source supplying the second color into the light mixing tunnel;
- a first dichroic mirror that reflects light of the second color and passes light of the first color, the first dichroic mirror being in the mixing tunnel at a first angle to allow the light of the first color to pass through to an output port and reflect the light of the second color in the direction of the output port so as to mix the first color light and second color light at the output port.

14. The system of claim 13 further comprising at least one lens at the first opening and second opening of the light mixing tunnel.

15. The system of claim 13 wherein the mixing tunnel has a third opening for receiving light from a third light source emitting light of a third color, the mixing tunnel further comprising a second dichroic mirror that reflects light of the third color and passes light of the first color and second color, the second dichroic mirror being in the mixing tunnel at an angle to allow the light of the first color and second color to pass through to an output port and reflect the light of the third color in the direction of the output port so as to mix the first color, second color, and third color light at the output port.

16. The system of claim 1 wherein the application system comprises a light wavelength conversion system having a light entrance opening smaller in cross-section than the first cross-sectional area.

17. The system of claim 16 wherein the at least one light emitting element acts as a pump light source emitting blue or UV light in a first direction through an opening in the partially reflective element, and wherein the light wavelength conversion system comprises:
- a first dichroic mirror at an oblique angle with respect to the first direction, the dichroic mirror passing the blue or UV light;
- a first phosphor for converting the blue or UV light to a longer wavelength light of a first color upon being energized by the blue or UV light, the first phosphor being located to receive the blue or UV light after passing through the dichroic mirror and emitting light of the first color;
- the dichroic mirror having a surface that reflects light of the first color, wherein the dichroic mirror receives the light emitted by the first phosphor and directs the light to an output port of the light wavelength conversion system.

18. The system of claim 17 wherein the application system also comprises a light mixing tunnel receiving light emitted by the first phosphor reflected off the dichroic mirror and receiving light of one or more other wavelengths, the mixing tunnel comprising:
- a first opening optically receiving the first color light from the light wavelength conversion system;
- a second opening for receiving light from a second light source emitting light of a second color;
- wherein the light mixing tunnel has internally reflective walls;
- a first dichroic mirror that reflects light of the second color and passes light of the first color, the first dichroic mirror being in the mixing tunnel at a first angle to allow the light of the first color to pass through to an output port and reflect the light of the second color in the direction of the output port so as to mix the first color light and second color light at the output port.

19. The system of claim 1 wherein the partially reflective element reflecting light that would not be effectively employed in the application system had the light not been reflected comprises the partially reflective element reflecting all light that would not be effectively employed in the application system had the light not been reflected comprises.

20. The system of claim 1 wherein the application system comprises a projection display system.

* * * * *